US009294423B2

(12) United States Patent
Parent et al.

(10) Patent No.: US 9,294,423 B2
(45) Date of Patent: Mar. 22, 2016

(54) COMMUNICATION SYSTEMS AND RELATED METHODS FOR NOTIFYING DEVICES HAVING A PLURALITY OF UNIQUE IDENTIFIERS ABOUT MISSED COMMUNICATIONS

(71) Applicant: Sorenson Communications, Inc., Salt Lake City, UT (US)

(72) Inventors: Jesse Parent, Cottonwood Heights, UT (US); Merle L. Walker, West Jordan, UT (US); Richard Shields, Salt Lake City, UT (US)

(73) Assignee: SORENSON COMMUNICATIONS, INC., Salt Lake City, UT (US)

( * ) Notice: Subject to any disclaimer, the term of this patent is extended or adjusted under 35 U.S.C. 154(b) by 140 days.

(21) Appl. No.: 13/837,619

(22) Filed: Mar. 15, 2013

(65) Prior Publication Data

US 2014/0272814 A1    Sep. 18, 2014

(51) Int. Cl.
  *H04M 1/64* (2006.01)
  *H04L 12/58* (2006.01)
  *G09B 21/00* (2006.01)
  *G06F 3/0484* (2013.01)
  *H04M 3/42* (2006.01)

(52) U.S. Cl.
  CPC .............. *H04L 51/10* (2013.01); *G06F 3/0484* (2013.01); *G09B 21/009* (2013.01); *H04L 51/24* (2013.01)

(58) Field of Classification Search
  CPC .................................................. H04W 36/385
  USPC ................. 379/88.01–88.21; 455/414.1, 415
  See application file for complete search history.

(56) References Cited

U.S. PATENT DOCUMENTS

| 5,619,555 | A | 4/1997 | Fenton et al. |
| 5,815,563 | A | 9/1998 | Ardon et al. |
| 5,923,733 | A | 7/1999 | Binns et al. |

(Continued)

FOREIGN PATENT DOCUMENTS

| EP | 2 104 324 A2 | 9/2009 |
| EP | 2 369 883 A1 | 9/2011 |

(Continued)

OTHER PUBLICATIONS

1NUMBER User Guide the Z.

(Continued)

*Primary Examiner* — Solomon Bezuayehu
(74) *Attorney, Agent, or Firm* — TraskBritt

(57) ABSTRACT

Apparatuses and methods for notifying a group of communication devices about a missed call are disclosed. Each communication device is associated with a group identifier that is shared with all the communication devices in a group. Each communication device is also associated with an individual identifier that is unique to that communication device. An unanswered communication to the group identifier is received on all the communication devices in the group. A first communication device transmits to a remote server an acknowledgement notification that the unanswered communication related to the group identifier has been acknowledged by the user. A clear indicator indicating that the unanswered communication has been acknowledged is transmitted from the remote server to all the devices in the group except the first communication device. Each of the communication devices receiving the clear indicator can then clear its indicator that notifies the user of a missed call.

21 Claims, 9 Drawing Sheets

(56) References Cited

U.S. PATENT DOCUMENTS

| | | |
|---|---|---|
| 5,930,723 A | 7/1999 | Heiskari et al. |
| 6,018,668 A | 1/2000 | Schmidt |
| 6,574,655 B1 | 6/2003 | Libert et al. |
| 6,993,355 B1 | 1/2006 | Pershan |
| 7,050,861 B1 | 5/2006 | Lauzon et al. |
| 7,283,833 B2 | 10/2007 | Fukui et al. |
| 7,526,306 B2 | 4/2009 | Brems et al. |
| 7,801,953 B1 | 9/2010 | Denman et al. |
| 7,853,703 B1 | 12/2010 | McBarron et al. |
| 8,223,930 B2 | 7/2012 | Narang et al. |
| 8,289,900 B2 | 10/2012 | DuMas et al. |
| 8,358,765 B1 | 1/2013 | Whitten et al. |
| 8,520,807 B1 | 8/2013 | Hewinson |
| 2002/0057783 A1 | 5/2002 | Kredo et al. |
| 2003/0009592 A1 | 1/2003 | Stahura |
| 2003/0041138 A1 | 2/2003 | Kampe et al. |
| 2003/0086554 A1 | 5/2003 | Krimstock et al. |
| 2003/0093537 A1 | 5/2003 | Tremlett et al. |
| 2003/0097466 A1 | 5/2003 | Sung |
| 2003/0125072 A1 | 7/2003 | Dent |
| 2004/0081136 A1* | 4/2004 | Brown et al. ............... 370/352 |
| 2004/0137882 A1 | 7/2004 | Forsyth |
| 2004/0223598 A1 | 11/2004 | Spiridellis |
| 2005/0267876 A1 | 12/2005 | Watanabe et al. |
| 2006/0099983 A1 | 5/2006 | Kim |
| 2006/0230043 A1 | 10/2006 | Sumner-Moore |
| 2007/0167141 A1 | 7/2007 | Akiyama |
| 2007/0232342 A1 | 10/2007 | Larocca |
| 2007/0280464 A1 | 12/2007 | Hughes et al. |
| 2008/0002671 A1 | 1/2008 | Nagai |
| 2008/0037745 A1 | 2/2008 | Ramamoorthy et al. |
| 2008/0037748 A1 | 2/2008 | Jefferson et al. |
| 2008/0064350 A1 | 3/2008 | Winkler |
| 2008/0119172 A1 | 5/2008 | Rao et al. |
| 2008/0189351 A1 | 8/2008 | Nemoto et al. |
| 2008/0288494 A1 | 11/2008 | Brogger et al. |
| 2009/0013380 A1 | 1/2009 | Chandrasiri et al. |
| 2009/0034696 A1 | 2/2009 | Ramanathan |
| 2009/0106199 A1 | 4/2009 | Wang |
| 2009/0238356 A1 | 9/2009 | Kojo et al. |
| 2010/0136980 A1 | 6/2010 | Linquist et al. |
| 2010/0184454 A1 | 7/2010 | Luft et al. |
| 2011/0135077 A1 | 6/2011 | Wengrovitz |
| 2011/0142221 A1* | 6/2011 | Tofighbakhsh et al. .. 379/202.01 |
| 2011/0199915 A1* | 8/2011 | Santhanam et al. .......... 370/252 |
| 2011/0270880 A1 | 11/2011 | Jesse et al. |
| 2011/0317684 A1 | 12/2011 | Lazzaro et al. |
| 2012/0028618 A1* | 2/2012 | Goel et al. ................. 455/414.1 |
| 2012/0102073 A1 | 4/2012 | Patel |
| 2012/0220325 A1 | 8/2012 | Zhou et al. |
| 2012/0257756 A1 | 10/2012 | Huang et al. |
| 2012/0296756 A1 | 11/2012 | Shah |
| 2012/0314849 A1* | 12/2012 | LeBlanc et al. ............ 379/88.23 |
| 2013/0010708 A1 | 1/2013 | Abraham et al. |
| 2013/0021957 A1 | 1/2013 | Fang et al. |
| 2013/0070912 A1 | 3/2013 | Parandekar et al. |
| 2013/0100870 A1 | 4/2013 | Xie et al. |
| 2013/0223318 A1 | 8/2013 | Liu et al. |
| 2013/0325922 A1* | 12/2013 | Chaudhri ............... G06Q 10/10 709/203 |
| 2014/0148136 A1 | 5/2014 | Thange |
| 2014/0267580 A1 | 9/2014 | Parent et al. |
| 2014/0280562 A1 | 9/2014 | Shields |
| 2014/0282041 A1 | 9/2014 | Walker et al. |
| 2014/0282095 A1 | 9/2014 | Walters et al. |

FOREIGN PATENT DOCUMENTS

| | | |
|---|---|---|
| WO | WO 00/30374 | 5/2000 |
| WO | WO 2005/101757 A1 | 10/2005 |
| WO | WO 2008/124447 A1 | 10/2008 |

OTHER PUBLICATIONS

1NUMBER Quick Start Guide.
Z-20 User Guide.
1NUMBER User Guide the Z, at http://www.zvrs.com/services/features/1number, at least as early as Feb. 8, 2012.
1NUMBER Quick Start Guide, at http://www.zvrs.com/services/features/1number, at least as early as Feb. 8, 2012.
Z-20 User Guide, at http://www.zvrs.com/products/hardware/z-20/, at least as early as Feb. 7, 2012.

* cited by examiner

(12) United States Patent
US 9,294,423 B2

COMMUNICATION SYSTEMS AND RELATED METHODS FOR NOTIFYING DEVICES HAVING A PLURALITY OF UNIQUE IDENTIFIERS ABOUT MISSED COMMUNICATIONS

CROSS-REFERENCE TO RELATED APPLICATIONS

This application is related to U.S. patent application Ser. No. 13/842,401, filed Mar. 15, 2013, titled "COMMUNICATION SYSTEMS AND RELATED METHODS FOR COMMUNICATING WITH DEVICES HAVING A PLURALITY OF UNIQUE IDENTIFIERS; U.S. patent application Ser. No. 13/840,046, filed Mar. 15, 2013, titled "SYSTEMS INCLUDING AND METHODS OF OPERATING COMMUNICATION DEVICES ASSIGNED INDIVIDUAL AND GROUP IDENTITIES"; U.S. patent application Ser. No. 13/839,384, filed Mar. 15, 2013, titled "SYSTEM, METHODS, AND DEVICES FOR REPLACING A CONTACT ENTRY CORRESPONDING TO A COMMUNICATION DEVICE WITH A CONTACT ENTRY CORRESPONDING TO A USER GROUP"; and U.S. patent application Ser. No. 13/840,659, filed Mar. 15, 2013, titled "A USER INTERFACE FOR CREATING AND ADMINISTERING A USER GROUP, AND METHODS OF OPERATING SUCH," the disclosure of each of which is incorporated herein in its entirety by this reference.

FIELD

Embodiments of the present disclosure relate to operating a plurality of communication devices as a group within a communication system. More particularly, the present disclosure relates to operation of video communication devices for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

As a consequence of the recent proliferation of communication devices, many people own several communication devices capable of video calls. For example, a single user may have one or more video phones at home, one or more video phones at their place of employment, a smart phone device, a tablet computer, a laptop computer, and/or a personal computer. The user may use some or all of these communication devices for video calls.

Conventionally, each of these communication devices are individually managed and are associated with separate user accounts. As a result, a user of multiple communication devices may be required to keep track of different login credentials for each separate communication device. In addition, each individual communication device may have its own unique identifier (e.g., phone number, IP address, or other similar identifier used by a specific system) that is used to make and receive video calls. As a result, users have the burden of informing others what the unique identifiers are for each individual communication device so that others may contact them. Other people may also be inconvenienced by keeping track of several unique identifiers for the user when dialing a call to or receiving caller identification (caller ID) information from the user's various communication devices.

Also, having a plurality of different communication devices may become burdensome for the user to maintain information among each of their communication devices. For example, if a user desires to block an undesired caller, change device or account settings, access messages, or add new contacts to a directory on one of the communication devices, the action may need to be repeated separately on each of the rest of the communication devices. Furthermore, if a video call is missed on one of the communication devices, the user often only becomes aware the missed call only when the user is again in the proximity of that particular communication device.

BRIEF SUMMARY

Embodiments of the present disclosure include a communication device including a user interface configured to present a missed call notification to a user indicating that the user has received an unanswered communication to a group unique identifier and receive an indication from the user that the unanswered communication has been acknowledged. The communication device is configured to transmit an acknowledgement notification to a remote server that the unanswered communication related to the group unique identifier has been acknowledged. The communication device is also configured to communicate with the remote server responsive to being addressed both with the group unique identifier assigned to a user group that the communication device belongs to and an individual unique identifier assigned to the communication device.

Other embodiments of the present disclosure include a server, including a memory configured for storing computing instructions and a processor operably coupled to the memory and configured for executing the computing instructions. The computing instructions cause the processor to associate a plurality of communication devices with each other in a user group such that each communication device of the plurality of communication devices is associated with a group unique identifier that is shared with the plurality of communication devices of the user group and an individual unique identifier that is unique to that communication device. The computing instructions also cause the processor to receive an acknowledgement notification from a first communication device indicating that the user has acknowledged a missed call notification related to an unanswered communication to the group unique identifier on the communication device. The computing instructions also cause the processor to transmit a clear indicator to all the plurality of communication devices in the user group except the first communication device, the clear indicator indicating that the missed call notification has been acknowledged.

Other embodiments of the present disclosure include a method for notifying a plurality of communication devices. The method includes receiving an unanswered communication to a group unique identifier on a plurality of communication devices. Each communication device of the plurality of communication devices is associated with the group unique identifier that is shared with the plurality of communication devices of a user group and an individual unique identifier that is unique to that communication device. The method also includes transmitting from a first communication device of the plurality of communication devices to a remote server an acknowledgement notification that the unanswered communication related to the group unique identifier has been acknowledged. The method also includes transmitting a clear indicator from the remote server to all the plurality of communication devices in the user group except the first communication device, the clear indicator indicating that the unanswered communication has been acknowledged.

DETAILED DESCRIPTION

Figure 1:
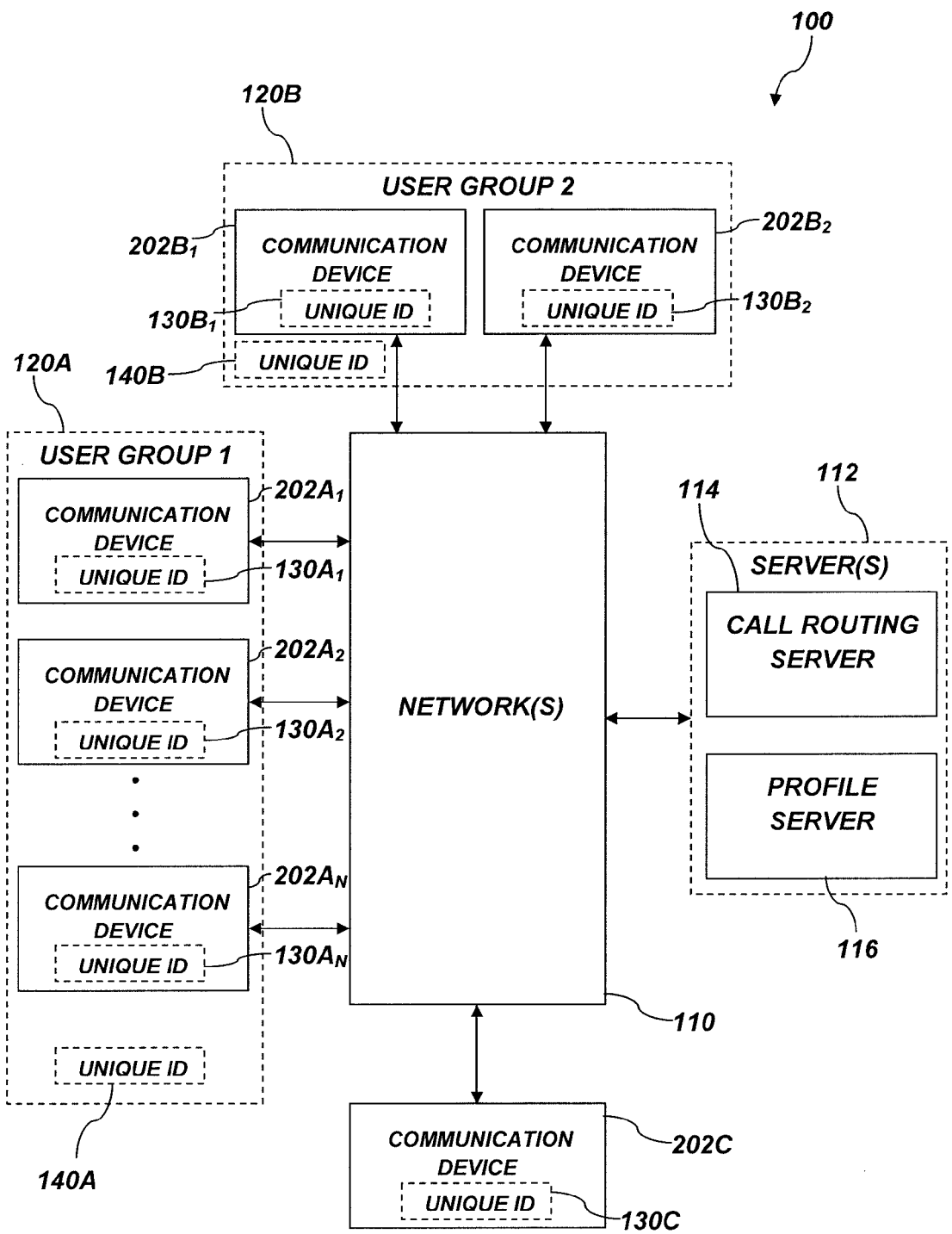
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include ways to notify communication devices belonging to a group that a call has been missed as well as way to clear that notification on all the devices in the group. As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, embodiments of the present disclosure may include any application or environment where notification about missed calls may be helpful or desirable. For example, it is contemplated that embodiments of the present disclosure may include video communication session between hearing-capable users.

The term "call" refers to a communication with a communication device that may be routed through a number of networks, such as, for example, a private network, the internet, a telephone system, and a VRS. The term "incoming call" refers to an incoming communication to a communication device.

The term "communication device" may refer to a specific compilation of hardware components, software components, or a combination thereof. The term "communication device" may also refer to a software based communication device that exists on a device configured to execute machine-readable commands, such as, for example a computer. As software, it should be understood that the same communication device may exist on a first device while a user accesses the communication device on the first device, and on a second device at a different time while the user accesses the communication device on the second device.

FIG. 1 is a simplified block diagram of a communication system 100 according to an embodiment of the present disclosure. The communication system 100 may include a plurality of communication devices $202A_1$, $202A_2$, ... $202A_N$, $202B_1$, $B_2$, $202C$ (which are collectively referred to as communication devices 202). In some instances, reference may be made to an individual communication device by the generic designation of reference numeral 202. The communication system 100 may further include one or more servers 112, with which the communication devices 202 communicate through one or more networks 110. In other words, the communication devices 202 may be configured to establish communication with the one or more servers 112 (also referred to simply as "servers" 112) through the one or more networks 110 (also referred to simply as "networks" 110). The communication devices 202 may be configured to communicate with each other over a video call with the assistance of the servers 112 as described more fully below.

Each of the communication devices 202 may be assigned an individual unique identifier 130. In some instances, reference may be made to an individual unique identifier by the general designation of reference numeral 130. For example, communication devices $202A_1$, $202A_2$, ... $202A_N$ may respectively be assigned an individual unique identifier $130A_1$, $130A_2$, ... $130A_N$. In addition, the communication devices $202B_1$, $202B_2$ may respectively be assigned an individual unique identifier $130B_1$, $130B_2$. The communication device 202C may be assigned an individual unique identifier 130C. The individual unique identifier 130 is, therefore, device-centric rather than user-centric or location-centric. In other words, an individual unique identifier 130 may be associated with an individual communication device 202. In general, individual unique identifiers 130 are not shared by multiple communication devices 202. In some respects, an individual unique identifier 130 may be similar to a telephone number. For example, the individual unique identifier 130 may be used by other people to initiate video calls with the user of the communication device 202 associated with the individual unique identifier 130. In other respects, the individual unique identifier 130 may be similar to an IP address. For example, the individual unique identifier 130 may be used to identify the communication devices 202 to the servers 112. The individual unique identifier 130 may have a numerical format, such as an IP address or a phone number (e.g., a seven digit number, a ten digit number including an area code, etc.). The individual unique identifier 130 may have an alphabetic format (e.g., a word, a phrase, etc.), an alphanumerical format, or other suitable format used to uniquely identify an individual communication device 202. As another non-limiting example, the individual unique identifier 130 may be a Media Access Control (MAC) address, which uniquely identifies a network interface of the communication device 202.

The communication devices 202 may also be associated with one or more user groups 120A, 120B (which are collectively referred to as user groups 120). In some instances, reference may be made to an individual user group by the generic designation of reference numeral 120. A user group 120 may be may be an association (i.e., grouping) of communication devices 202 that are defined as members of the user group 120, as desired by a user. A user group 120 may be associated with any number of communication devices 202 so long as there are at least two communication devices 202 grouped together by the user. By way of non-limiting example, communication devices $202A_1$, $202A_2$, ... $202A_N$ may be associated with a first user group 120A. The first user group 120A may be associated with a first user. Other communication devices $202B_1$, $202B_2$ may be associated with a second user group 120B. The second user group 120B may be associated with a second user. The communication system 100 may include communication devices 202 that may not be associated, such as communication device 202C, may not be associated with any user group.

The user groups 120A, 120B may respectively be assigned a group unique identifier 140A, 140B (which are collectively referred to as group unique identifiers 140). The group unique identifiers 140 are unique to a group rather than to an individual communication device 202. In other words, the group unique identifiers 140 are group-centric, such that the group unique identifiers 140 are not shared by other user groups 120. Therefore, individual communication devices 202 may be associated with both an individual unique identifier 130 and a group unique identifier 140. For example, a first communication device $202A_1$ may be associated with the individual unique identifier $130A_1$ and the group unique identifier 140A. Likewise, a second communication device 202A2 may be associated with the individual unique identifier $130A_2$ and the group unique identifier 140A. Thus, because the first communication device $202A_1$ and the second communication device $202A_2$ are part of the same user group 120A, the first communication device $202A_1$ and the second communication device $202A_2$ share the same group unique identifier 140A (but not individual unique identifiers $130A_1$, $130A_2$). Other user groups (e.g., user group 120B) may be similarly configured.

A call may be initiated to the communication devices 202 by being addressed by either its individual unique identifier 130 or its group unique identifier 140. For example, if a person (e.g., the second user) calls the first user by entering the individual unique identifier $130A_1$, only the individual communication device $202A_1$ may indicate an incoming call. If, however, a person calls the first user by entering the group unique identifier 140A assigned to the first user group 120A, each of the communication devices $202A_1$, $202A_2$, ... $202A_N$ of the first user group 120A may indicate an incoming call. An incoming call may be indicated visually, tactilely, audibly, or some other suitable indication, and combinations thereof. For hearing-impaired users, an incoming call may be indicated visually, tactilely, and combinations thereof.

As discussed above, the communication devices 202 may be associated with a user group 120 as desired by the user. In other words, the reasons for grouping the communication devices 202 within a particular user group 120 may be determined by the user acting as a group organizer, rather than any particular limitation. For example, each communication device 202 belonging to a user group 120 need not be located in close proximity to each other. By way of non-limiting example, a single user group 120 may include a communication device 202 stationed at a user's dwelling, a communication device 202 at the user's place of employment, a communication device 202 at the user's cabin, and a portable communication device 202 that may be carried anywhere. It should also be understood that two or more communication devices 202 from the same user group 120 may be located proximate to each other. By way of non-limiting example, two or more communication devices 202 from the same user group 120 may be stationed in various locations of the user's home, such as in the living room, the kitchen, the bedroom, etc.

In addition, the communication devices 202 associated with a single user group 120 may belong to two or more users. By way of non-limiting example, communication devices 202 belonging to friends, family members, co-workers, and/or roommates may be part of a single user group 120. As a result, the user acting as the group organizer may invite others to join one or more of their communication devices 202 to join his group. For example, a user group 120 may be a group of co-workers within a team or practice group, such as a technical support team.

A single user group 120 may also include several different types of communication devices 202. By way of non-limiting example, an individual user group 120 may include any one or more of a personal computer, a smart phone, a tablet computer, and a video phone. In addition, a single user group 120 may include multiple communication devices from the same device type. For example, an individual user group 120 may have a plurality of video phones within the same individual user group 120. Furthermore, a single user group 120 may include any number of communication devices 202, limited only by the capacity of the communication system 100, and/or a desire to limit services to user groups 120 of a predetermined number of communication devices 202. By way of non-limiting example, administrators of a communication system 100 may choose to limit the number of communication devices 202 that a group organizer may be allowed to include within single user group 120 to a maximum number (e.g., five, six, etc.) of allowed communication devices 202.

The communication devices 202 may be configured to enable a user to participate in video calls with the other communication devices 202 of the communication system 100. A "video call" refers to communications where real-time or quasi real-time video data is exchanged between at least two parties. A video call may also refer to an attempted initiation of a real-time or quasi real-time video data exchange. For example, a first user using a first communication device $202A_1$ may communicate with one or more other users using any of the other communication devices $202A_2$, ... $202A_N$ associated with the first user group 120A, the communication devices $202B_1$, $202B_2$ associated with the second user group 120B, another communication device 202C not associated with a user group 120, and combinations thereof.

Any one of a variety of communication devices 202 may be configured to place and receive video calls, in part, because advancements in communication device technology have substantially increased the quantity, variety, and affordability of communication devices. By way of non-limiting example, the communication devices 202 may include any of a video phone, a desktop computer, a laptop computer, a tablet computer, a smart phone, and other suitable devices. Examples of a video phone include the NTOUCH® VP video phone and the VP-200 video phone available from SORENSON COMMUNICATIONS® of Salt Lake City, Utah. More device-level detail on the communication devices 202 is discussed below with reference to FIG. 2.

The networks 110 may include an internet protocol network configured to transmit communications between each of the plurality of communication devices 202 and the servers 112, such as by using an Internet protocol (IP). The networks 110 may include a wide area network (WAN), a local area network (LAN), a personal area network (PAN), and combinations thereof. In some embodiments, the servers 112 may be part of a cloud network. The networks 110 may be configured to communicate with the plurality of communication devices 202 and the servers 112 wirelessly, through a cable, and combinations thereof. Some non-limiting examples of suitable wireless communications may include "wifi," Bluetooth, and mobile wireless networks. Some non-limiting examples of suitable cables include fiber-optic cables, coaxial cables, traditional telephone cables, and Ethernet cables.

The servers 112 may be configured to provide services to the communication devices 202. For example, the servers 112 may be configured to manage calling functions, such as video call sessions and messages for the communication devices 202 of the communication system 100. In addition, the servers 112 may store and manage account information for the communication devices 202. Account information may include address books, account billings, and other information corresponding to the communication device 202 associated with the individual unique identifier 130. As non-limiting examples, the servers 112 may include a call routing server 114 and a profile server 116. Although discussed herein separately, the call routing server 114 and the profile server 116 may optionally be implemented as a single server device. Likewise, both the call routing server 114 and the profile server 116 may optionally include multiple server devices, and the various functions of the call routing server 114 and the profile server 116 may not necessarily be isolated to separate devices.

The call routing server 114 may be configured to set up and control a video call between one or more of the plurality of communication devices 202 and another of the plurality of communication devices 202, or a communication device associated with another user (not shown). The call routing server 114 may be configured to establish and control the video call through, for example, a session initiation protocol (SIP), or other suitable protocol.

The call routing server 114 may also periodically receive communications from each of the plurality of communication devices 202, including location or contact information, so that the call routing server 114 may locate and setup video call sessions with the communication devices 202 as needed. Also, the call routing server 114 may cause a particular communication device 202 to indicate an incoming call responsive to another person entering the individual unique identifier 130 assigned to the particular communication device 202. Furthermore, when the user enters the individual unique identifier 130 associated with another communication device 202 from one of the plurality of communication devices 202, the call routing server 114 may arrange for an outgoing call to be sent to the communication device 202 with the entered individual unique identifier 130 assigned thereto. In addition, when the user enters the group unique identifier 140 associated with a user group 120, the call routing server 114 may arrange for an outgoing call to be sent to each of the communication devices 202 associated with the entered group unique identifier 140 assigned thereto.

The profile server 116 may be configured to manage one or more user accounts associated with the individual unique identifiers 130. In some embodiments, the profile server 116 may also be configured to store information associated with each user account within the communication system 100. By way of non-limiting example, the profile server 116 may be configured to store an address book, a blocked caller list, a message history, text messages, video messages, a call history, personal user information, and combinations thereof, associated with each user account. In other embodiments, each of the communication devices 202 may be configured to store the information associated with the user account corresponding to the individual unique identifier 130 assigned thereto.

The servers 112 may be configured to enable the communication devices 202 to be associated with a user group 120. The user group 120 may, in some respects, function similarly to a separate communication device 102. For example, the user group 120 may be assigned a group unique identifier 140 and be associated with corresponding group account and group information, such as a group blocked caller list, a group message history, group text messages, group video messages, a group call history, a group address book (i.e., contact list), and combinations thereof, which may be stored on the profile server 116. Accessing any communication device 202 in the user group 120 may enable the user to access the group information, and communicate through the networks 110 using the group unique identifier 140 assigned to the user group 120. In some embodiments, group information may simply be a matter of the servers 112 being able to access individual communication device information that is stored for each communication device 202 to be shared with other communication devices 202 of the user group 120.

In some embodiments, where activity performed on a second communication device 202A₂ causes changes to the group information, the profile server 116 may communicate the changes in group information to the rest of the plurality of communication devices 202 belonging to the user group 120. Each of the plurality of communication devices 202 may be configured to periodically enter communication with the profile server 116 to receive updates. By way of non-limiting example, each of the plurality of communication devices 202 may be configured to enter communication with the profile server 116 approximately every five minutes (or other periodic interval) to receive updates. In some embodiments, updates may be event-driven such that certain events may cause the profile server 116 to broadcast updates to one or more of the communication devices 202. Initiation of these information updates and synchronizations may be performed by the servers 112 or the communication devices 202.

In some embodiments, the communication device 202 that is the creator of the user group 120 may have its information (e.g., lists) serve as the basis for the shared group information (e.g., shared lists). As discussed above, shared lists may include a blocked caller list, a group message history, group text messages, group video messages, a group call history, a group address book (i.e., contact list). As a result, each of these group lists may be shared and accessible (for viewing, editing, adding to, etc.) by each communication device 202. If a shared group list is changed, the change may be saved within the profile server 116. In addition, the profile server 116 may broadcast a notification to each of the communication devices 202 within the user group 120 that a change has been made to the shared group lists and that their local cache needs to be updated. The individual communication devices 202 may respond (e.g., either immediately or at their next scheduled interval) to receive the updated information to store in their local cache. In addition, there may be shared settings among group members that may be edited and shared in a similar manner. For example, shared settings may include the number of rings that occur before going to voice mail, a common voice mail message that is applied to all communication devices 202 rather than each communication device 202 having its own, among other similar settings.

In some embodiments, the profile server 116 and/or the individual communication devices 202 may retain a prior version of their individual lists and settings that existed before they joined the user group 120. As a result, when a communication device 202 leaves the user group 120, the communication device 202 may no longer have access to the shared group lists and settings and their lists may revert back to the individual state that the communication device maintained prior to joining the user group 120.

Figure 2:
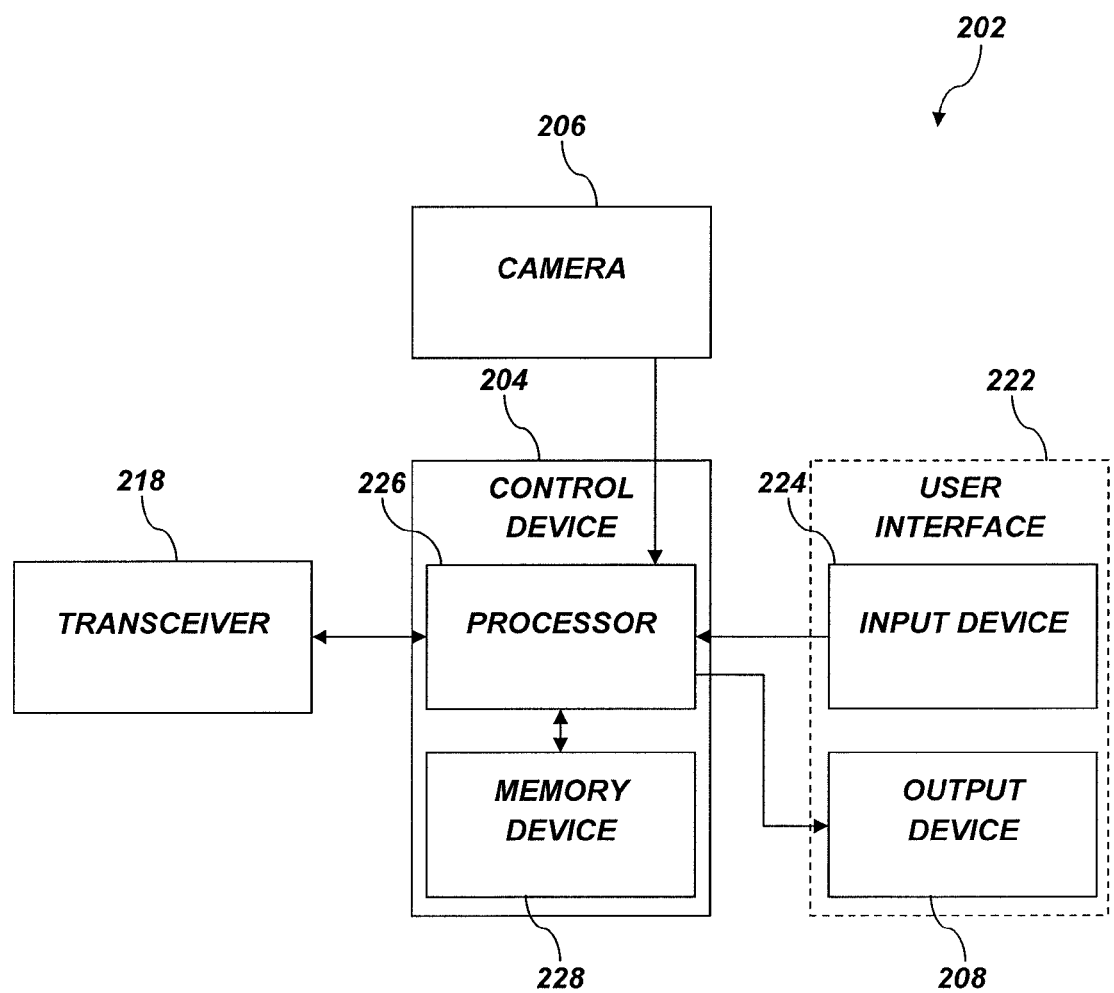
FIG. 2 is a simplified block diagram of a communication device according to some embodiments of the present disclosure.

FIG. 2 is a simplified block diagram of a computing device. The computing device may be a communication device 202 according to some embodiments of the present disclosure. The computing device may also be a server 112 according to some embodiments of the present disclosure. The computing system, whether a server 112 or a communication device 202 will be referred to in the description of FIG. 2 as a communication device 202. The communication device 202 may be one of the communication devices 202 shown in FIG. 1. The communication device 202 may include a control device 204 operably coupled to a camera 206, a transceiver 218, and a user interface 222. The control device 204 may include at least a processor 226 and a memory device 228. The processor 226 may be configured to execute commands stored on the memory device 228. By way of non-limiting example, the memory device 228 may include a computer readable media, such as, read only memory (ROM), random access memory (RAM), Flash memory, and combinations thereof. The control device 204 may be configured to control the camera 206, and the user interface 222. In addition, the control device 204 may be configured to cause the transceiver 218 to transmit and receive data through the networks 110.

The camera 206 may include devices capable of capturing and converting visual images to data, as will be readily apparent to those skilled in the art. By way of non-limiting example, the camera may include a webcam, a camcorder device, a camera device integrated into the same enclosure as the control device 204, and other suitable devices. The camera 206 may be operably coupled to the control device 204 and configured to deliver the data to the control device 204.

The user interface 222 may include an input device 224 and an output device 208 operably coupled to the control device 204. By way of non-limiting example, the input device 224 may include a keyboard, a numerical keypad, a mouse, a touch-screen, a button array, a track pad, a remote control, motion sensors, orientation sensors, position sensors, a microphone, and combinations thereof. The input device 224 may be configured to receive commands from the user. Also by way of non-limiting example, the output device 208 may include any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the input device 224 and the output device 208 may be integrated in the same device, such as, for example, a touch-screen display. In other embodiments, the input device 224 and the output device 208 may be implemented in separate devices, such as a keyboard and an LCD monitor, respectively.

The control device 204 may cause the output device 208 to display video images received as data at the transceiver 218 during a video call. The control device 204 may also cause the output device 208 to display options on the output device 208, such as through a graphical user interface displayed on the output device 208. In addition, the control device 204 may execute user commands received by the input device 224.

The user interface 222 may enable the user of the communication device 202 to take several types of actions. Some of these actions may include logging in to the communication device 202 as a specific user, creating a new user group 120, inviting another communication device 202 to join a user group 120, withdrawing a communication device 202 from the user group 120, place a video call to another communication device 202, accept an incoming call from another communication device 202, access account information associated with the communication device 202, access account information associated with a user group 120 with which the communication device 202 is associated, etc.

Figure 3A:
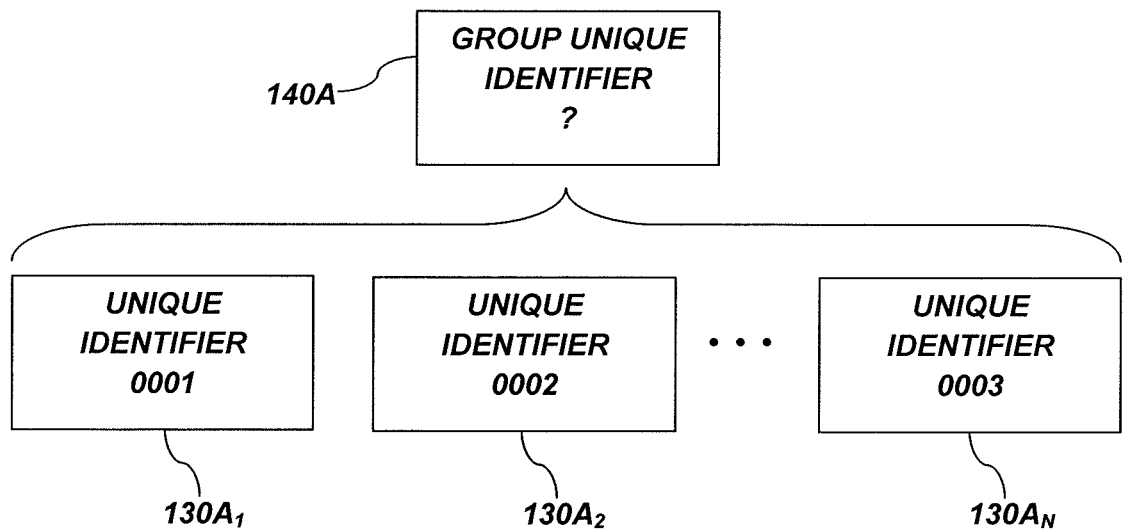
FIGS. 3A and 3B illustrate a method for assigning a group unique identifier to a user group according to an embodiment of the present disclosure.
Figure 3B:
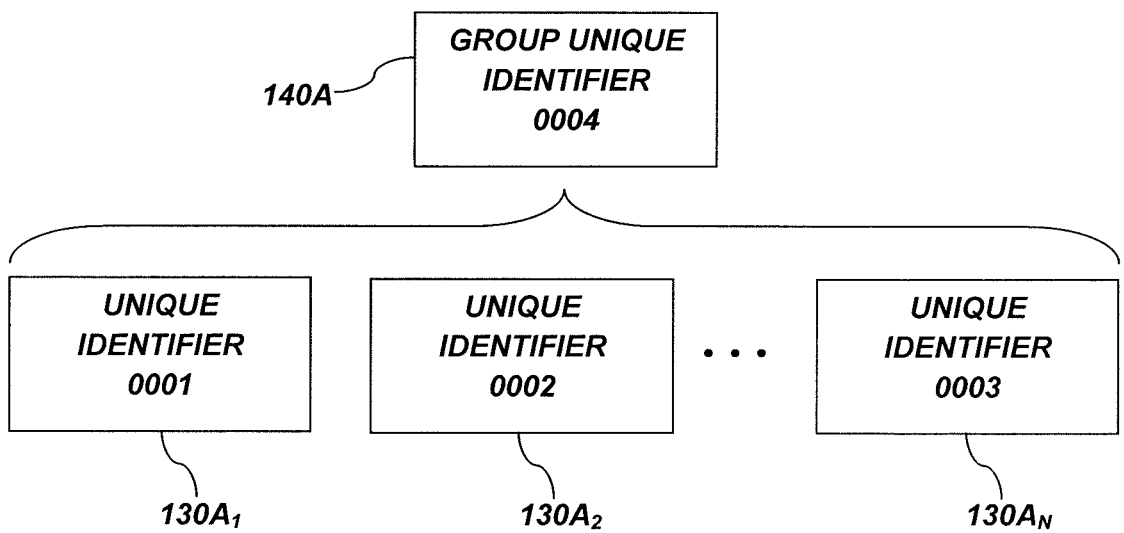

FIGS. 3A and 3B illustrate a method for assigning a group unique identifier 140 to a user group 120 according to an embodiment of the present disclosure. In particular, the first group 120A (FIG. 1) may receive a group unique identifier 140A to be associated with each of the communication devices 202 (FIG. 1) that are members of the first group 120A. As depicted in FIGS. 3A and 3B, the group unique identifier 140A may be a completely new identifier that was not previously an individual unique identifier $130A_1$, $130A_2$, $130A_N$ that is associated with one of the communication of the first user group 120A.

For example, the first user may decide to group together a plurality of communication devices 202, wherein each of the plurality of communication devices 202 have already been assigned their own individual unique identifiers 130. For example, the first communication device $202A_1$ is associated with the first individual unique identifier $130A_1$ of "0001," the second communication device $202A_2$ is associated with the second individual unique identifier $130A_2$ of "0002," and the Nth communication device $202A_N$ is associated with the Nth individual unique identifier $130A_N$ of "0003."

As depicted in FIG. 3A, when the first user group 120A is created, the group unique identifier 140A may be unassigned. As depicted in FIG. 3B, the first user group 120A may be assigned a new group unique identifier 140A that was not previously assigned to any communication device 202 of the newly formed user group 120A. In other words, when the first user group 120A is created, the first user group 120A may be initialized with a new individual unique identifier $130A_1$ assigned thereto. For example, the group unique identifier 140A assigned to the user group 120A is "0004." The four digit unique identifiers 130, 140 are illustrated as a simple example of a unique identifier. As discussed above, the unique identifiers 130, 140 may be a telephone number, IP address, or other suitable identifier.

Figure 4A:
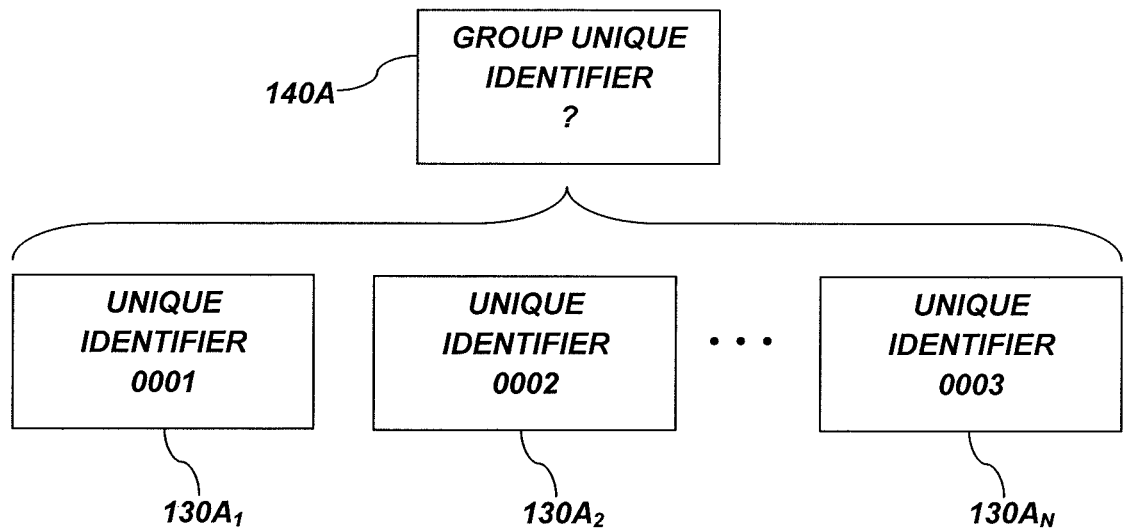
FIGS. 4A and 4B illustrate a method for assigning a group unique identifier to a user group according to another embodiment of the present disclosure.
Figure 4B:
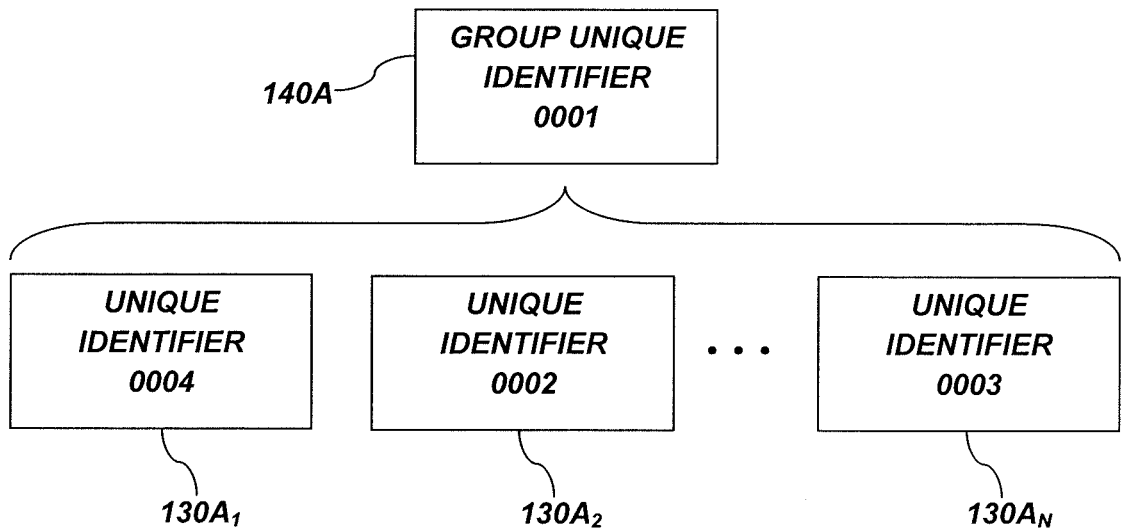

FIGS. 4A and 4B illustrate a method for assigning a group unique identifier 140 to a user group 120 according to another embodiment of the present disclosure. In particular, the first group 120A (FIG. 1) may receive a group unique identifier 140A to be associated with each of the communication devices 202 (FIG. 1) that are members of the first group 120A. As depicted in FIGS. 4A and 4B, the group unique identifier 140A may be a selected from an existing individual unique identifier 130A that was previously an individual unique identifier $130A_1$, $130A_2$, $130A_N$ that is associated with one of the communication of the first user group 120A.

For example, in some embodiments, the group unique identifier 140A assigned to the user group 120A may be selected from among the individual unique identifiers $130A_1$, $130A_2$, . . . $130A_N$ that are part of the user group 120A. For example, the individual unique identifier $130A_1$ of the first communication device $202A_1$ may be "promoted" to be the group unique identifier 140A for the first user group 120A. As a result, the individual unique identifier $130A_1$ ("0001") previously associated with the first communication device $202A_1$ may be "sacrificed" and becomes the unique identifier 140A for the first user group 120A. In some embodiments, another individual unique identifier $130A_1$ ("0004") may be assigned to the first communication device $202A_1$ so that the first communication device $202A_1$ may remain associated with both the individual unique identifier $130A_1$ and the group unique identifier 140A associated with the first user group 120A.

When a user group 120 is established, the information (contacts, blocked calls, etc.) associated with the individual communication devices 202 may become group information (i.e., accessible through the other communication devices 202 of the user group 120), as desired by the user. In some embodiments involving a user group 120 initiated through promotion of an existing individual unique identifier 130 to become the group unique identifier 140 associated with the user group 120, only the information for that individual communication device 202 (e.g., communication device $202A_1$) may be promoted to be group information.

Even though the establishment of the user group 120A is described with reference to FIGS. 3A, 3B, 4A, and 4B in terms of assigning the group unique identifier 140A to a newly established user group 120A, similar methods may be used to change the group unique identifier 140 after the user group 120 has been established. Therefore, the group unique identifier 140 assigned to the user group 120 may be changed by assigning a completely new group unique identifier 140 to the user group 120. In addition, the group unique identifier 140 may be changed by promoting one of the individual unique identifiers 130 to be the new group unique identifier 140 assigned to the user group 120, which may cause that a new individual unique identifier 130 be assigned to the corresponding communication device 202. In addition, the group unique identifier 140 associated with the user group 120 may be "demoted." In other words, the group unique identifier 140 assigned to the user group 120 may once again become associated with a corresponding first communication device 202, and a new group unique identifier 140 may be assigned (e.g., new issuance, promotion, etc.) to the user group 120, or the user group 120 may be dissolved.

Figure 5A:
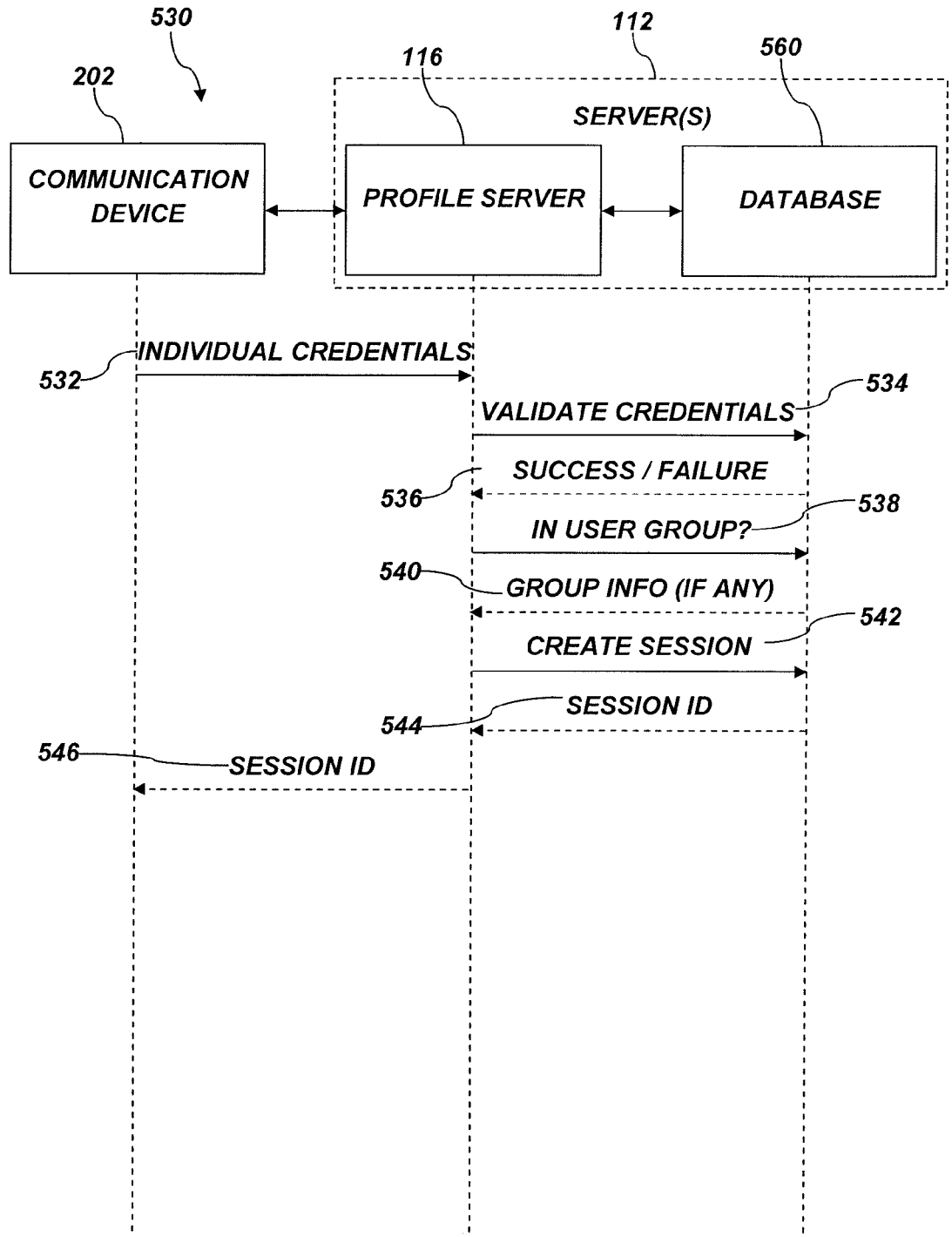
FIGS. 5A and 5B are data flow charts illustrating data flow between a communication device, a profile server, and a database associated with the profile server.
Figure 5B:
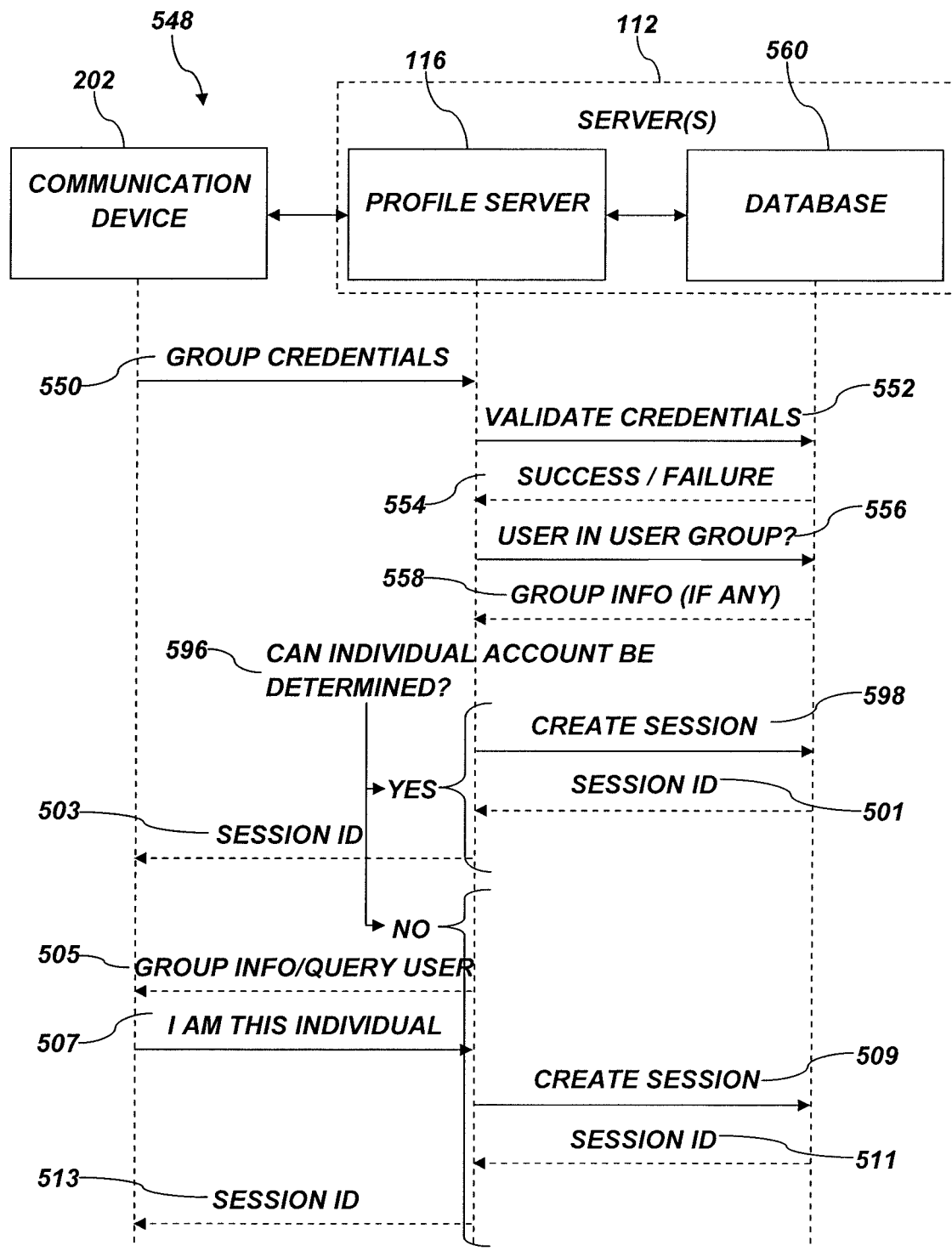

FIGS. 5A and 5B are data flow charts 530, 548 illustrating data flow between a communication device 202, a profile server 116, and a database 560 associated with the profile server 116. FIG. 5A illustrates data flow resulting from communication device 202 logging in with individual credentials associated with the communication device to access account information. FIG. 5B illustrates data flow resulting from the communication device 202 logging in with group credentials associated with a user group 120 to access account information, the communication device 202 belonging to the user group 120.

The database 560 may be configured to store individual account information corresponding to the communication device 202 and group account information corresponding to a user group 120 (FIG. 1) to which the communication device 202 belongs. Individual account information may include valid individual log in credentials (also referred to herein as "individual credentials"), user information, and individual communication device 202 information associated with the communication device 202. Group account information may include valid group log in credentials (also referred to herein as "group credentials"), user information, and group information associated with the user group. The group account information may also include information corresponding to a plurality of communication devices 202 that belong to the user group 120.

Referring to FIG. 5A, the user of the communication device 202 may provide individual credentials through the user interface 222 (FIG. 2) of the communication device 202. By way of non-limiting example, the individual credentials may be a user name and password. In some embodiments, the user name may be the individual unique identifier 130 assigned to the communication device 202. Other individual credentials, such as for example a user selected user name, are also contemplated.

At operation 532, the communication device 202 may send the individual credentials through the networks 110 (FIG. 1) to the profile server 116. At operation 534, the profile server 116 may send a validation request to the database 560 to validate the individual credentials provided by the user against the valid individual credentials stored in the database 560.

At operation 536, the database 560 may send a success/failure signal to the profile server 116 indicating either success or failure of the log in attempted by the user of the communication device 202. If the individual credentials provided by the user of the communication device 202 do not match those stored in the database 560, then the success/failure signal sent to the profile server 116 may indicate failure of the log in attempt. As a result, the user may not be given access to account information. If, on the other hand, the log in credentials provided by the user of the communication device 202 match those stored on the database 560, the success/failure signal sent to the profile server 116 may indicate a successful log in attempt. As a result, the user may be given access to the individual account information.

In some embodiments, the profile server 116 may also cause the communication device to give the user access to the group account information along with the individual account information if the communication device 202 belongs to the user group 120. If, however, the communication device 202 is not associated with the user group 120, then the profile server 116 may cause the communication device 202 to only access the individual account information. In other embodiments, logging in with the individual credentials may exclude the communication device 202 from accessing the group account information regardless of whether the communication device 202 belongs to the user group.

If the log in attempt succeeds, at operation 538 the profile server 116 may query the database 560 to determine whether the communication device 202 belongs to a user group 120. At operation 540, the database 560 may send the group account information to the profile server 116 if the communication device 202 is part of the user group 120. If, on the other hand, the communication device 202 is not part of the user group 120, the database 560 may only send the individual account information, and not the group account information.

The profile server 116 may create a session and cause a session identifier to be stored on the database 560 at operation 542. At operation 544, the database may send the session identifier to the profile server 116. At operation 546, the profile server 116 may send the session identifier through the networks 110 to the communication device 202, and the user may operate the communication device 202 as both the communication device 202 and the user group 120 if the communication device 202 belongs to the user group 120, and only as the communication device 202 if the communication device 202 does not belong to the user group 120.

Referring to FIG. 5B, the user of the communication device 202 may provide group credentials through the user interface 222 (FIG. 2) of the communication device 202. The group credentials may include a user name and password. In some embodiments, the user name may be the group unique identifier 140 assigned to the communication device 202. Other group credentials, such as for example a user selected username, are also contemplated.

At operation 550, the communication device 202 may send the group credentials through the networks 110 (FIG. 1) to the profile server 116. At operation 552, the profile server 116 may send a validation request to the database 560 to validate the group credentials provided by the user against the valid group credentials stored in the database 560.

At operation 554, the database 560 may send a success/failure signal to the profile server 116 indicating either success or failure of the log in attempted by the user of the communication device 202. If the group credentials provided by the user of the communication device 202 do not match those stored in the database 560, then the success/failure signal sent to the profile server 116 may indicate failure of the log in attempt. As a result, the user may not be given access to account information. If, on the other hand, the group credentials provided by the user of the communication device 202 match those stored on the database 560, the success/failure signal sent to the profile server 116 may indicate a successful log in attempt. As a result, the user may be given access to the group account information.

If the log in attempt succeeds, at operation 556 the profile server 116 may query the database 560 to determine whether the communication device 202 belongs to a user group 120. At operation 558, the database 560 may send the group account information to the profile server 116 if the communication device 202 is part of the user group 120. If, on the other hand, the communication device 202 is not part of the user group 120, the database 560 may not send the group account information.

Once the user succeeds in logging in with group credentials, at operation 596 the profile server 116 may attempt to determine which individual account information to give the communication device 202 access to along with the group account information. If the profile server 116 succeeds in determining which individual account information to provide, the profile server 116 may create a session and cause a session identifier to be stored on the database 560 at operation 598. At operation 501, the database may send the session identifier to the profile server 116. At operation 503, the profile server 116 may send the session identifier through the networks 110 to the communication device 202, and the user may operate the communication device 202 as both the communication device 202 and the user group 120.

Returning to operation 596, if the profile server cannot determine which individual account information to provide to the user, at operation 505 the profile server may send the group account information to the communication device 202 and query the user to indicate which individual account information to provide. At operation 507, the user may indicate the individual account information that should be provided, and the indication may be sent to the profile server 116. At operation 509, the profile server may create a session, and cause a session identifier to be stored in the database 560. The database 560 may send the session identifier to the profile server 116 at operation 511, and the profile server 116 may send the session identifier through the networks 110 to the communication device 202 at operation 513. The user may then operate the communication device 202 as both the communication device 202 and the user group 120. As a result, using a group unique identifier 140 to log in may also cause the communication device 202 to communicate with the one or more servers 112 responsive to being addressed by the individual unique identifier 130 assigned to the communication device.

Figure 6:
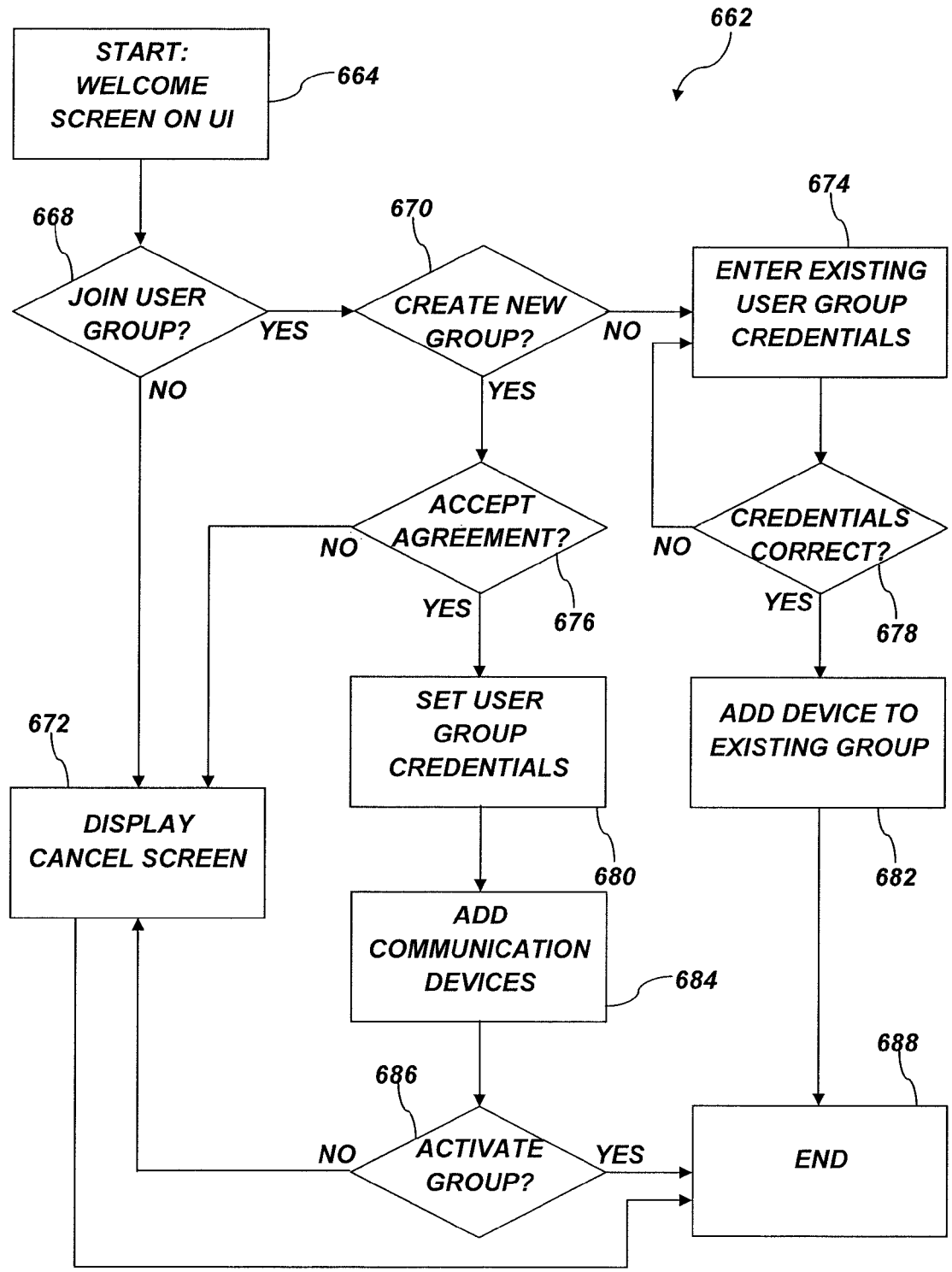
FIG. 6 is a flowchart of a method for adding a communication device to a new or existing user group.

FIG. 6 is a flowchart 662 of a method for adding a communication device 202 (FIGS. 1 and 2) to a new or existing user group 120. At operation 664, the user interface 222 (FIG. 2) may display a welcome screen to a user of the communication device 202. At operation 668, the user interface 222 may display an option to join a user group 120 (FIG. 1). If the user rejects the option to join a user group 120, at operation 672 the user interface 222 may display a cancel screen, and at operation 688 the method may end. If the user accepts the option to join a user group 120, at operation 670 the user interface 222 may provide an option to create a new user group 120.

If the option to create a new user group 120 is accepted, at operation 676 the user interface 222 may display an agreement delineating any terms required for creating the new user group 120, and an opportunity is provided to accept or reject the agreement. If the agreement is rejected, at operation 672 the user interface 222 may display the cancel screen, and at operation 688 the method may end. If, on the other hand, the agreement is accepted, at operation 680 the user interface 222 may prompt the user to set group credentials, including, for example, a group unique identifier 140 (FIG. 1) and a password. At operation 684 the user interface 222 may prompt the user to add other communication devices 202 to the new user group 120. The profile server 116 (FIG. 2) may send invitations to join the new user group 120 to any communication devices 202 added by the user. At operation 686, the user interface 222 may provide the user an option to activate the new user group 120. If the user elects to activate the new user group 120, the new user group 120 may be activated, and at operation 688 the method may end. If the user elects not to activate the new user group 120, at operation 672 the cancel screen may be displayed, and at operation 688, the method may end.

If the option to create a new user group 120 is denied, the user interface 222 may prompt the user to enter existing user group 120 credentials at operation 674. At operation 678, if the credentials are not correct, the user interface 222 may once again prompt the user to enter existing user group 120 credentials at operation 674. At operation 678, if the credentials are correct, the communication device 202 may be added to the existing user group 120 at operation 682. At operation 688 the method may end.

In embodiments of the present disclosure, when a customer receives a missed call (also referred to herein as an unanswered communication), their group of phones will all display that the call was missed. When one of the phones in the group clears the missed call notifications, all phones in the group will also clear the missed call notification. In other words, a group of separate phones owned by a customer that have different phone numbers get a call on their shared number, the customer can go to any of their phones in the group to see that they missed a call. In addition, when they clear the missed call notification on one of the phones in the group, they do not have to go to each of the phones in the group to clear the notification on them, as well.

Figure 7:
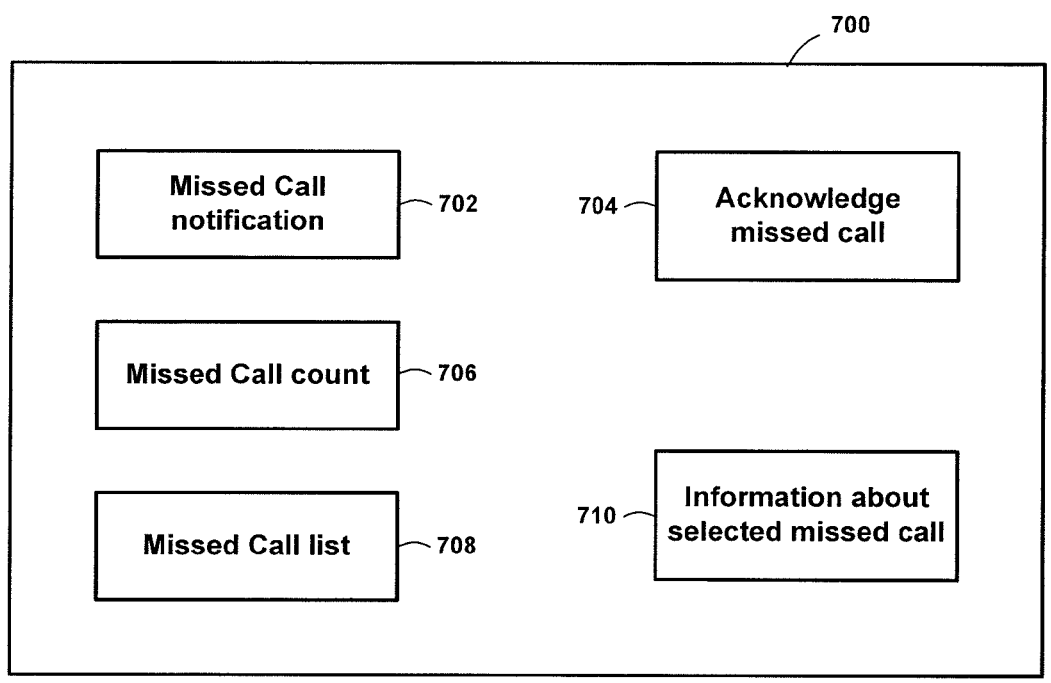
FIG. 7 is a simplified depiction of graphical user interface indicating elements that may be used in a missed call notification.

FIG. 7 is a simplified depiction of graphical user interface 700 indicating elements that may be used in a missed call notification. In describing FIG. 7, reference is also made to FIG. 1. A missed call notification element 702 may be used to notify the user that a call was not answered. This missed call may be to the individual unique identifiers (e.g., $130A_1$, $130A_2$ in FIG. 1) or to the group unique identifier (e.g., 140A in FIG. 1). When the missed call is to an individual unique identifier, only the communication device 202 with the individual unique identifier will activate its missed call notification element 702. However, when the missed call is to the group unique identifier 140A all the communication devices in the user group will activate their missed call notification element 702.

An acknowledge missed call element 704 is included on the user interface 700. The user can select the acknowledge missed call element 704 on a given communication device 202 and that communication device 202 will clear its missed call notification element 702. However, the other communication devices 202 in the user group 120A still have the missed call notification element 702 activated. It is inconvenient for the user to have to go to each communication device 202 in the user group 120A to clear the missed call notification element 702 on those communication devices 202. Embodiments of the present disclosure provide a way to automatically clear those missed call notification element 702 on the other communication devices 202.

A missed call count 706 may also be included on the user interface 700. This missed call count may be incremented each time a new missed call is received and may be decremented each time a missed call is acknowledged either by the user on that specific device or through the automatic method described below.

An information element 710 may be included to provide additional information about the missed call, such as, for example, a caller id with an identification of a phone number or other identifier, a name of the caller, a picture of the caller, or access to a message left by the caller. The message left by the caller may be in the form of a voice message or a video message. In some embodiments, the missed call list 708 and the information element 710 may be maintained and updated separately from the missed call notification element 702. As a result, even after the missed call notification elements 702 have been cleared on all the communication devices in the group, the user can still retrieve information about any of the calls in the missed call list 708 on any of the communication devices 202 in the user group 140A.

Moreover, the missed call notification 702, the missed call count 706, and the missed call list 708 may combine missed voice calls and missed video calls. Alternatively there may be one set of the missed call notification 702, the missed call count 706, and the missed call list 708 for voice calls and another set of the missed call notification 702, the missed call count 706, and the missed call list 708 for video calls. Also, in some embodiments, the missed call count 706, the missed call list 708, and the information about selected missed calls 710 may not be present or may be navigated to on separated graphical user interfaces.

In addition, the missed call notification 702 need not be on a display of the communication device 202. It could be any suitable means of notifying the user, such as a vibration, a flashing light, or a configuration of flashing lights.

Figure 8:
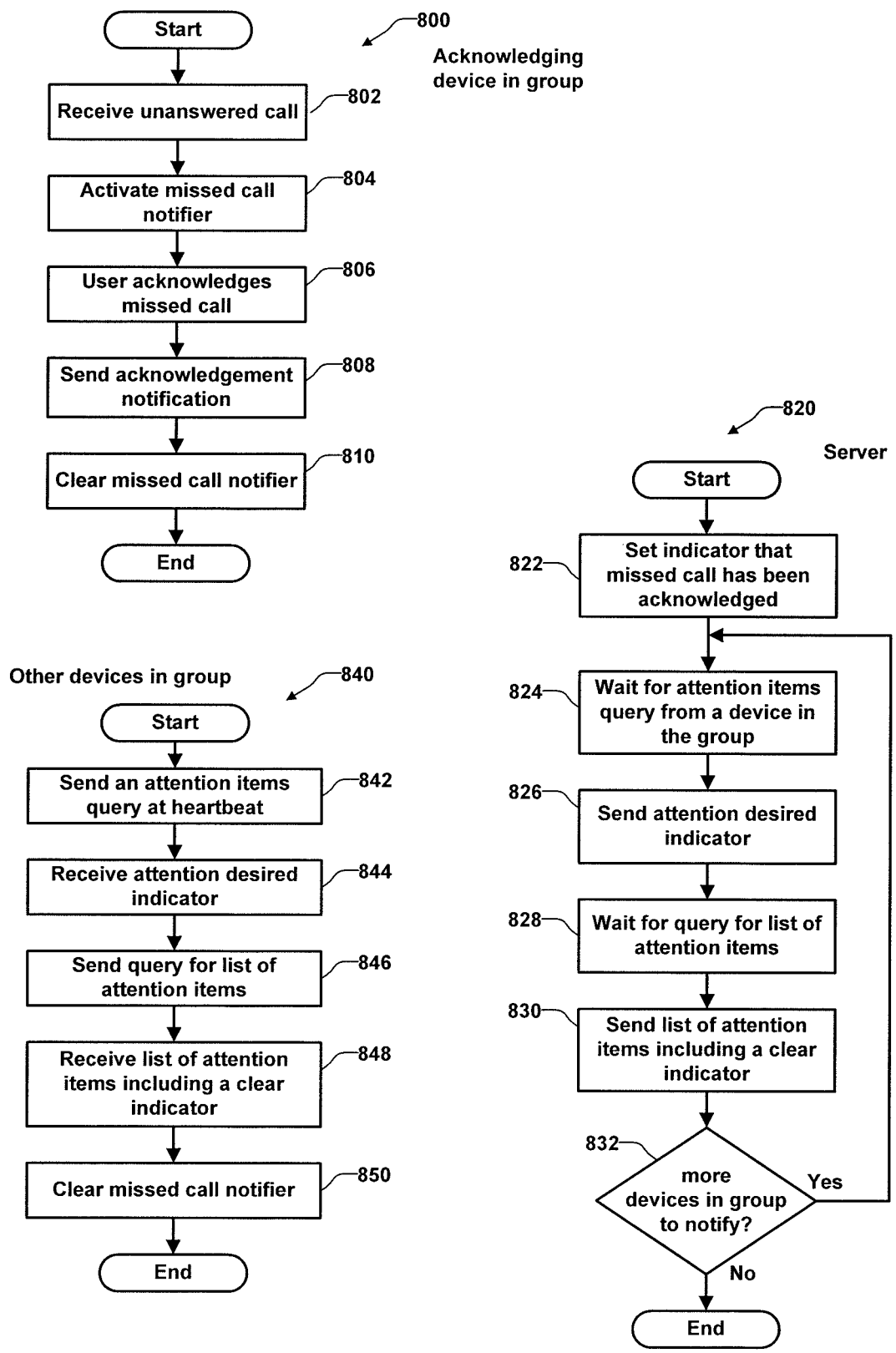
FIG. 8 is a flowchart illustrating a method for managing a missed call notification between a group of communication devices.

FIG. 8 is a flowchart illustrating a method for managing a missed call notification between a group of communication devices. In describing FIG. 7, reference is also made to FIG. 1. A first process 800 occurs on one of the communication devices that the user uses to acknowledge the missed call. For convenience, this communication device 202 will be referred to as the first communication device. A second process 820 occurs on a server 112 that the communication devices 202 in the user group 120A communicate with. As a non-limiting example the server may be the profile server 116 described above. A third process 840 occurs on all the other communication devices 202 in the group except the first communication device. Thus, in FIG. 1, if the first communication device is device $202A_1$, then all the other communication devices would be devices $202A_2$ through $202A_N$.

First, at operation 802, an unanswered call is received. For embodiments of the present disclosure this would be a call to the group unique identifier 140A. While illustrated in the first process, this call goes to all the communication devices 202 in the user group 120A. It is assumed that the call to the group unique identifier 140A is not answered on any of the communication devices 202 in the user group 120A.

At operation 804, the missed call notification element 702 (FIG. 7) is activated. Once again, this operation will occur on all the communication devices 202 in the user group 120A. At operation 806, the user acknowledges the missed call on the first communication device $202A_1$. The user can do this by selecting the acknowledge missed call element 704 (FIG. 7).

At operation 808, the first communication device $202A_1$ sends an acknowledgment notification to the server 112 indicating that the missed call has been acknowledged on the first communication device $202A_1$. At operation 810, the first communication device $202A_1$ may clear its missed call notification element 702.

The second process 820 on the server 112 begins when the server receives the acknowledgment notification from the first communication device $202A_1$. At operation 822, the server sets an indicator that the missed call has been acknowledged and needs to be distributed to other communication devices in the user group 120A. At operation 824 the server 112 waits for an attention items query from a communication device 202 in the user group 120A.

Embodiments of the present disclosure operate on a process of periodic queries by the communication devices 202. This periodic query process is referred to herein as a heartbeat. Each communication device maintains its own heartbeat (e.g., a heartbeat every 10 seconds). When the heartbeat occurs, the communication device 202 sends the attention items query to the server 112 asking if there are any items that need the attention of that particular communication device 202. The server 112 responds to the attention items query with an attention desired indicator, which can indicate that the server 112 has some items for the communication device 202 to consider or there are no items to consider at this heartbeat.

When the communication device 202 receives a positive attention items query, it follows up with a query for a list of the attention items. When the server 112 receives this query, it sends the communication device 202 a list of any items that the communication device may need to act upon.

Thus, in the third process 840 at operation 842, each of the communication devices 202 sends an attention items query to the server at the time of its particular heartbeat. In response, at operation 826, the server 112 sends an attention desired indicator to the communication device 202 that has sent the request. In embodiments of the present disclosure, this indicator would be positive at least because there is an acknowledgement of the missed call waiting to be sent to the communication device 202.

At operation 844, the communication device 202 receives the positive attention desired indicator and responds with a query for the list of attention items at operation 846. Meanwhile, the server 112 may be in operation 828 waiting for the query for the list of attention items. Once received, at operation 830, the server 112 sends the list of attention items to the communication device 202. This list is received at the communication device 202 at operation 848. The list includes a clear indicator, which indicates that the missed call notification element 702 can be cleared on that communication device. Of course, the list of attention items may include other items for the communication device to act upon.

At operation 850, the communication device 202 clears its missed call notification element 702 and the process is complete for that communication device 202. However, other communication devices 202 in the user group 120A may not have yet had a heartbeat and have not, therefore, cleared their missed call notification element 702.

Decision 832 tests to see if there are other communication devices 202 in the user group 120A that still need to be notified. If not, the process ends and the server 112 can clear its indicator that there is a missed call acknowledgement to distribute. If so, control returns to operation 824 where the server 112 waits for an attention items query from another communication device 202 in the user group 120A, which will occur on the next heartbeat of that communication device 202.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A server, comprising:
   a memory configured for storing computing instructions; and a processor operably coupled to the memory and configured for executing the computing instructions to:
associate a plurality of communication devices with each other in a user group such that each communication device of the plurality of communication devices is associated with:
a group unique identifier that is shared with the plurality of communication devices of the user group; and
an individual unique identifier that is unique to that communication device;
receive an acknowledgement notification from a first communication device of the plurality of communication devices indicating that the user has acknowledged a missed call notification related to an unanswered call routed to the group unique identifier on the plurality of communication devices; and
transmit a clear indicator to all the plurality of communication devices in the user group other than the first communication device, the clear indicator indicating that the missed call notification has been acknowledged and that the corresponding missed call notification on each communication device receiving the clear indicator is removed from display thereon responsive to receiving the clear indicator, wherein the clear indicator is transmitted in response to receiving the attention item query by the server, wherein the clear indicator is transmitted in response to receiving the attention item query by the server.

2. The server of claim 1, wherein the processor is further configuredto execute the computing instructions to transmit the clear indicator to the first communication device also.

3. The server of claim 1, wherein the memory is configured to store other information related to the unanswered call that is retrievable by any of the plurality of communication devices before and after the clear indicator is transmitted.

4. The server of claim 3, wherein the other information includes an identification of a person, a calling communication device, or a combination thereof.

5. The communication device of claim 1, wherein the unanswered call is a voice communication.

6. The communication device of claim 1, wherein the unanswered call is a video communication.

7. A method for notifying a plurality of communication devices, the method comprising:
routing an unanswered call to a group unique identifier on a plurality of communication devices
wherein each communication device of the plurality of communication devices is associated with:
the group unique identifier that is shared with the plurality of communication devices of a user group; and
an individual unique identifier that is unique to that communication device;
receiving an acknowledgement notification at a remote server from a first communication device of the plurality of communication devices, the acknowledgement notification indicating that the unanswered call related to the group unique identifier has been acknowledged at the first communication device; and
transmitting a clear indicator from the remote server to at least all the plurality of communication devices in the user group other than the first communication device responsive to receiving the attention item query by the server, the clear indicator indicating that the unanswered call has been acknowledged and that a corresponding missed call notification displayed on each communication device receiving the clear indicator is removed from display thereon responsive to receiving the clear indicator.

8. The method of claim 7, wherein transmitting the clear indicator also includes transmitting the clear indicator to the first communication device.

9. The method of claim 7, further comprising transmitting an attention desired indicator to each communication device of the plurality from which an attention items query is received.

10. The method of claim 7, further comprising transmitting the clear indicator to each communication device of the plurality of communication devices from which a query is received.

11. The method of claim 7, wherein the unanswered call is a voice communication or a video communication.

12. The method of claim 11, further comprising storing other information related to the unanswered call that is retrievable by any of the plurality of communication device before and after the clear indicator is transmitted.

13. The server of claim 12, wherein the other information includes an identification of a person, a calling communication device, or a combination thereof.

14. The method of claim 7, further comprising presenting a missed call notification to the user on one or of the plurality of communication devices indicating that the user has received the unanswered call to the group unique identifier.

15. The method of claim 7, further comprising communicating from one communication device of the plurality to the remote server responsive to being addressed with either of the group unique identifier assigned to the user group that the communication device belongs to and the individual unique identifier assigned to the one communication device.

16. The method of claim 7, further comprising retrieving other information related to the unanswered call that is retrievable by any communication device of the plurality belonging to the user group before and after the clear indicator is transmitted.

17. The method of claim 16, wherein the other information includes an identification of a person, a calling communication device, or a combination thereof.

18. A video relay service for facilitating communication sessions and providing interpretive services for hearing-impaired users, the video relay service comprising:
a call routing server configured to:
send a video call request to a first communication device responsive to the video call request being associated with a first individual unique identifier for the first communication device; and
send the video call request to the first communication device and at least one additional communication device responsive to the video call request being associated with a group unique identifier for the first communication device and the at least one additional communication device as part of an assigned group of communication devices; and
a profile server configured to:
receive an acknowledgement notification from the first communication device indicating that the user has acknowledged a missed call notification displayed on the first communication device related to an unanswered video call request sent to the assigned group of communication device associated with the group unique identifier; and
transmit a clear indicator to the at least one additional communication device responsive to receiving the acknowledgement notification from the first communication device responsive to receiving the attention item query by the server, the clear indicator indicating that the a corresponding missed call notification displayed on the at least one additional communication device related to the unanswered video call is removed from display thereon responsive to receiving the clear indicator.

19. The video relay service of claim 18, wherein the call routing server and the profile server are part of separate server hardware devices.

20. The video relay service of claim 18, wherein the call routing server and the profile server are integrated within a same server hardware device.

21. The video relay service of claim 18, wherein the profile server is configured to transmit the clear indicator to the at least one additional communication device further responsive to receiving the attention items query from a heartbeat of the at least one additional communication device requesting a list attention items for the at least one additional communication device to act upon.

* * * * *

UNITED STATES PATENT AND TRADEMARK OFFICE
CERTIFICATE OF CORRECTION

PATENT NO. : 9,294,423 B2
APPLICATION NO. : 13/837619
DATED : March 22, 2016
INVENTOR(S) : Jesse Parent et al.

Page 1 of 1

It is certified that error appears in the above-identified patent and that said Letters Patent is hereby corrected as shown below:

In the specification:
COLUMN 1, LINES 19-20, change "titled "SYSTEM, METHODS," to --titled "SYSTEMS, METHODS,--

In the claims:
CLAIM 2, COLUMN 19, LINE 32, change "configuredto execute" to --configured to execute--

Signed and Sealed this
Fourteenth Day of June, 2016

Michelle K. Lee
*Director of the United States Patent and Trademark Office*